(12) United States Patent
Yamada et al.

(10) Patent No.: US 7,884,866 B2
(45) Date of Patent: Feb. 8, 2011

(54) IMAGING APPARATUS AND IMAGING METHOD

(75) Inventors: Manabu Yamada, Yokohama (JP); Kenji Shiraishi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 326 days.

(21) Appl. No.: 12/209,599

(22) Filed: Sep. 12, 2008

(65) Prior Publication Data

US 2009/0073282 A1 Mar. 19, 2009

(30) Foreign Application Priority Data

Sep. 14, 2007 (JP) ............................. 2007-240018
Jul. 1, 2008 (JP) ............................. 2008-172327

(51) Int. Cl.
*H04N 3/15* (2006.01)
*H04N 9/07* (2006.01)
*H04N 9/68* (2006.01)

(52) U.S. Cl. ........................................ 348/280; 348/234
(58) Field of Classification Search ................ 348/256, 348/222.1, 280, 234
See application file for complete search history.

(56) References Cited

U.S. PATENT DOCUMENTS

| 6,618,502 B1* | 9/2003 | Okada et al. ................ 348/647 |
| 7,019,274 B2 | 3/2006 | Yamada |
| 7,098,946 B1 | 8/2006 | Koseki et al. |
| 7,301,579 B2 | 11/2007 | Shinohara et al. |
| 7,324,150 B2 | 1/2008 | Shiraishi |
| 7,397,502 B2 | 7/2008 | Shiraishi |
| 2002/0163583 A1* | 11/2002 | Jones ........................ 348/272 |
| 2003/0147000 A1 | 8/2003 | Shiraishi |
| 2003/0169346 A1 | 9/2003 | Ojima et al. |
| 2004/0252224 A1 | 12/2004 | Shiraishi et al. |
| 2005/0062854 A1 | 3/2005 | Shiraishi |
| 2005/0134700 A1 | 6/2005 | Shiraishi |
| 2005/0151874 A1 | 7/2005 | Shiraishi |
| 2005/0168620 A1 | 8/2005 | Shiraishi |
| 2005/0212934 A1* | 9/2005 | Hoshuyama ................ 348/272 |
| 2007/0216951 A1 | 9/2007 | Shiraishi |
| 2007/0263933 A1 | 11/2007 | Ojima et al. |
| 2007/0268370 A1 | 11/2007 | Sanno et al. |
| 2008/0036901 A1 | 2/2008 | Shinohara et al. |
| 2008/0297633 A1* | 12/2008 | Wada .......................... 348/272 |
| 2010/0208097 A1* | 8/2010 | Tanabe ....................... 348/223.1 |

FOREIGN PATENT DOCUMENTS

| JP | 10-262182 | 9/1998 |
| JP | 2000-92378 | 3/2000 |
| JP | 2000-316163 | 11/2000 |
| JP | 2002-92607 | 3/2002 |
| JP | 2002-281361 | 9/2002 |
| JP | 2004-193762 | 7/2004 |
| JP | 2006-180270 | 7/2006 |

* cited by examiner

*Primary Examiner*—Jason Whipkey
(74) *Attorney, Agent, or Firm*—Dickstein Shapiro LLP (57) ABSTRACT

First YUV data produced from a pixel output in which one RAW-RGB data is read out from an SDRAM and is compensated in a dynamic range expansion compensating section of a YUV converting section and second YUV data produced from a pixel output which is equal to or more than a predetermined saturation level without performing a compensation process in the dynamic range expansion compensating section are loaded in a YUV compositing section, and then third YUV data is produced by compositing brightness data taken out from the first YUV data and color difference data taken out from the second YUV data.

12 Claims, 9 Drawing Sheets

| R | Gr | R | Gr | R | Gr | ...... |
|---|----|---|----|---|----|--------|
| Gb | B | Gb | B | Gb | B | ...... |
| R | Gr | R1 | Gr | R | Gr | ...... |
| Gb | B1 | Gb | B2 | Gb | B | ...... |
| R | Gr | R2 | Gr | R | Gr | ...... |
| Gb | B | Gb | B | Gb | B | ...... |
| R | Gr | R | Gr | R | Gr | ...... |
| Gb | B | Gb | B | Gb | B | ...... |
| . | . | . | . | . | . | |
| . | . | . | . | . | . | |

| R | Gr | R | Gr | R | Gr | ...... |
|---|----|---|----|---|----|--------|
| Gb | B | Gb | B | Gb | B | ...... |
| R | Gr | R | Gr | R | Gr | ...... |
| Gb | B | Gb | B | Gb | B | ...... |
| R | Gr | R | *Gr* | R | Gr | ...... |
| Gb | B | Gb | B | Gb | B | ...... |
| R | Gr | R | Gr | R | Gr | ...... |
| Gb | B | Gb | B | Gb | B | ...... |
| . | . | . | . | . | . | |
| . | . | . | . | . | . | |

A

IMAGING APPARATUS AND IMAGING METHOD

CROSS REFERENCE TO RELATED APPLICATIONS

The present invention is based on and claims priority from Japanese Patent Application Numbers 2007-240018, filed 14 Sep. 2007, and 2008-172327, filed 1 Jul. 2008, the disclosures of which are hereby incorporated by reference herein in their entireties.

BACKGROUND

The present invention relates to an imaging apparatus such as a digital still camera, a digital video camera, and the like, and to an imaging method. Especially, the present invention relates to an imaging apparatus which is capable of expanding a dynamic range of a shooting image and an imaging method therefor.

A dynamic range of an image shot by a digital still camera, a digital video camera, and the like having a solid-state image sensor such as a CCD and so on is far narrower than a dynamic range of an image shot by a traditional silver-halide camera using a silver-halide photography film. In a case where the dynamic range is narrow, "an underexposure" occurs in a dark area of a photographic subject and "an overexposure" occurs in a bright area of the photographic subject, and thereby image quality becomes lower.

In order to expand the dynamic range of the image imaged by the solid-state image sensor such as the CCD and so on, for example, Japanese Patent publication No. 2000-92378 discloses a technique in which a plurality of shootings is performed with different exposure amounts on the same photographic subject, a plurality of different exposure-amount images is obtained, and then these images are put together to produce a composite image with an expanded dynamic range.

However, in a case where a photographic subject is a moving object and is shot by a method of expanding the dynamic range as disclosed in Japanese Patent Publication No. 2000-92378 above, double-images are often obtained and thereby a composite image with an expanded dynamic range is not produced successfully.

SUMMARY

An object of the present invention is to provide an imaging apparatus which is capable of expanding a dynamic range at one shooting, without performing a plurality of shootings with different exposure amounts, and producing a composite image with an expanded dynamic range, and to provide an imaging method therefor.

An imaging apparatus according to embodiments of the present invention comprises: an image sensor which receives a photographic subject image which enters via an optical system on a light receiving surface having a plurality of pixels where a color separation filter of a plurality of colors is placed on a front side of each pixel, and converts into an electric signal; a pixel output judging section which judges each of the pixels output of the plurality of the pixels if any of the pixels output is equal to or more than a predetermined saturation level or not; a compensation processing section, in a case where a pixel output of a pixel where a color separation filter of a specific color is placed is judged to be equal to or more than the predetermined saturation level by the pixel output judging section, which compensates the pixel output which is judged to be equal to or more than the predetermined saturation level based on a pixel output of a pixel where a color separation filter other than the specific color is placed in the vicinity of the pixel output of the pixel where the color separation filter of the specific color is placed; and a YUV compositing section, based on first YUV data produced from a pixel output which is compensated by the compensation processing section and second YUV data produced from a pixel output which is equal to or more than the predetermined saturation level without being compensated by the compensation processing section, which produces third YUV data by compositing brightness data obtained from the first YUV data and color difference data obtained from the second YUV data.

Preferably, a processing unit, in a case of judging each pixel output of the plurality of the pixels in the pixel output judging section, is a size of 2×2 pixels in horizontal and vertical directions.

Preferably, the imaging apparatus further comprises: a selecting section which selects and performs the compensation process, in a case where a pixel output of the plurality of the pixels on which the color separation filter of the specific color is placed is equal to or more than the predetermined saturation level.

Preferably, the imaging apparatus further comprises: a bit compressing section which recompresses data of a pixel output, which is once extended to a second bit number from a first bit number which is equal to or less than the predetermined saturation level outputted from the compensation processing section in a case where the pixel output of the plurality of pixels where the color separation filter of the specific color is placed is equal to or more than the predetermined saturation level, to the first bit number, and in the bit compressing section, a compression rate, which is smaller than a compression rate for data corresponding to a pixel output in an area where the pixel output is equal to or more than the predetermined saturation level, is used for data corresponding to a pixel output in an area where the pixel output is equal to or less than the predetermined saturation level.

Preferably, a compression rate to become approximately a same value before and after a bit compression in the bit compressing section is used for data corresponding to a pixel output in a low brightness level where the pixel output is equal to or less than the predetermined saturation level.

Preferably, in a case where there is a defective pixel in the processing unit, a pixel, which is in the vicinity of the defective pixel and where the color separation filter of the same color as the defective pixel is placed, is used instead of using the defective pixel.

An imaging method of an imaging apparatus having an image sensor which receives a photographic subject image which enters via an optical system on a light receiving surface having a plurality of pixels where a color separation filter of a plurality of colors is placed on a front side of each pixel, and converts into an electric signal, the imaging method according to embodiments of the present invention comprising: a pixel output judging step of judging each of the pixels output of the plurality of the pixels if any of the pixels output is equal to or more than a predetermined saturation level or not; a compensation processing step of, in a case where a pixel output of a pixel where a color separation filter of a specific color is placed is judged to be equal to or more than the predetermined saturation level by the pixel output judging step, compensating the pixel output which is judged to be equal to or more than the predetermined saturation level based on a pixel output of a pixel where a color separation filter other than the specific color is placed in the vicinity of the pixel output of the pixel where the color separation filter of the specific color is placed; and a YUV compositing step of, based on first YUV data produced from a pixel output which is compensated by the compensation processing step and second YUV data produced from a pixel output which is equal to or more than the predetermined saturation level without being compensated by the compensation processing step, producing third YUV data by compositing brightness data obtained from the first YUV data and color difference data obtained from the second YUV data.

Preferably, a processing unit, in a case of judging each pixel output of the plurality of the pixels in the pixel output judging step, is a size of 2×2 pixels in horizontal and vertical directions.

Preferably, the imaging method further comprises: a selecting step of selecting and performing the compensation process, in a case where a pixel output of the plurality of the pixels on which the color separation filter of the specific color is placed is equal to or more than the predetermined saturation level.

Preferably, the imaging method further comprises: a bit compressing step of recompressing to the first bit number, data of a pixel output, which is once extended to a second bit number from a first bit number which is equal to or less than the predetermined saturation level outputted from the compensation processing step in a case where the pixel output of the plurality of pixels where the color separation filter of the specific color is placed is equal to or more than the predetermined saturation level, and in the bit compressing step, a compression rate, which is smaller than a compression rate for data corresponding to a pixel output in an area where the pixel output is equal to or more than the predetermined saturation level, is used for data corresponding to a pixel output in an area where the pixel output is equal to or less than the predetermined saturation level.

Preferably, a compression rate to become approximately a same value before and after a bit compression in the bit compressing step is used for data corresponding to a pixel output in a low brightness level where the pixel output is equal to or less than the predetermined saturation level.

Preferably, in a case where there is a defective pixel in the processing unit, a pixel which is in the vicinity of the defective pixel and where the color separation filter of the same color as the defective pixel is placed is used instead of using the defective pixel.

BRIEF DESCRIPTION OF THE PREFERRED EMBODIMENTS

Hereinafter, with reference to the drawings, embodiments of the present invention will be explained.

Embodiment 1

Figure 1A:
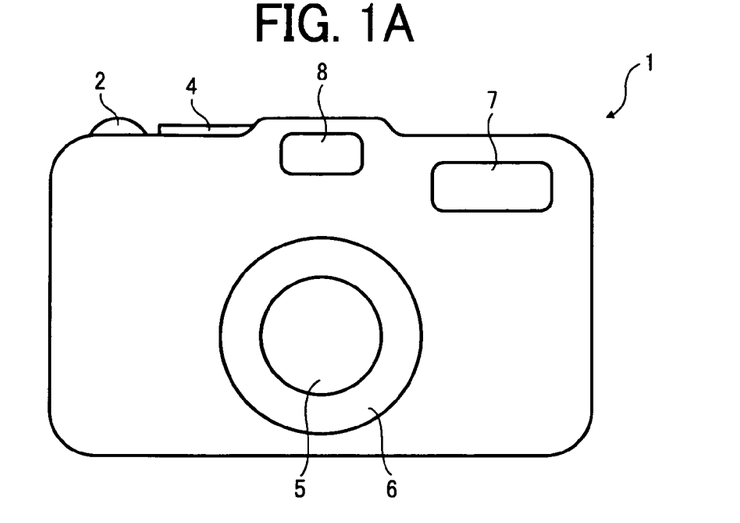
FIG. 1A is a front view of a digital camera as an example of an imaging apparatus according to an embodiment 1 of the present invention.
Figure 1B:
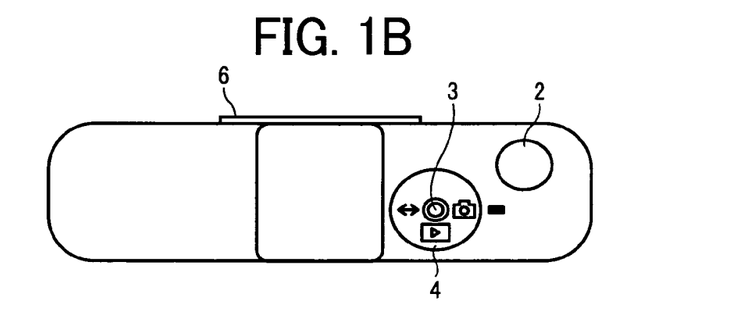
FIG. 1B is a top view of the digital camera as an example of the imaging apparatus according to the embodiment 1 of the present invention.
Figure 1C:
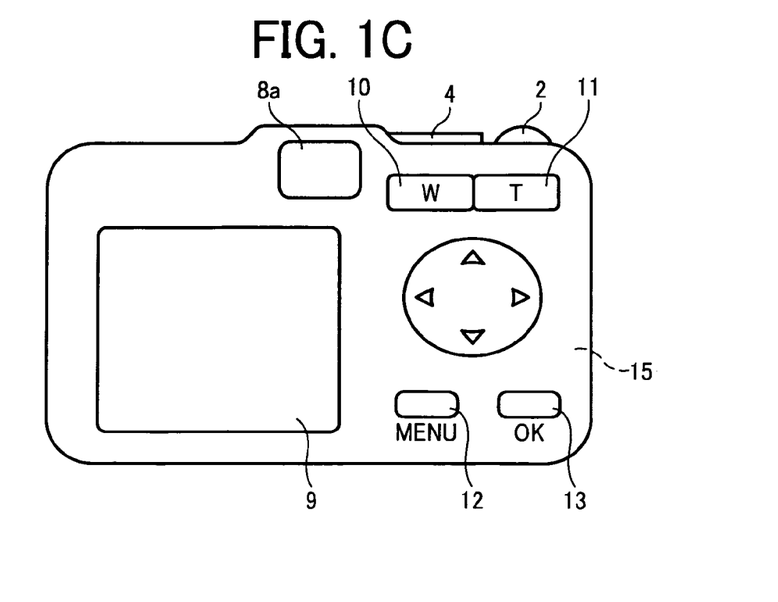
FIG. 1C is a back view of the digital camera as an example of the imaging apparatus according to the embodiment 1 of the present invention.
Figure 2:
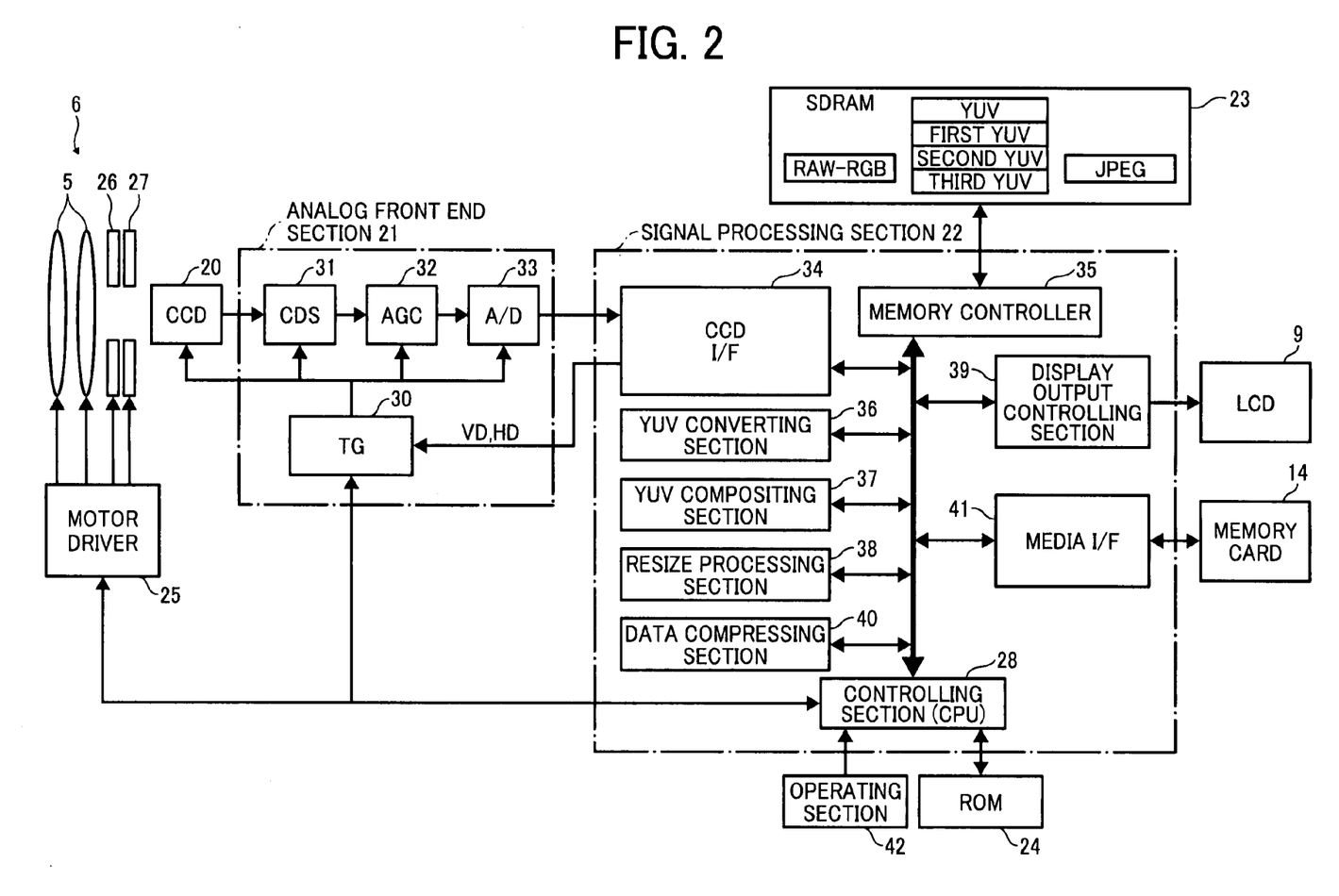
FIG. 2 is a schematic block diagram illustrating a system structure in the digital camera as an example of the imaging apparatus according to the embodiment 1 of the present invention.

FIG. 1A is a front view, FIG. 1B is a top view, and FIG. 1C is a back view of a digital still camera (hereinafter, it is called a "digital camera") as an example of an imaging apparatus according to an embodiment 1 of the present invention. FIG. 2 is a schematic block diagram illustrating a system structure in the digital camera illustrated in FIGS. 1A to 1C.

(External Appearance Structure of a Digital Camera)

As illustrated in FIGS. 1A to 1C, on a top side of the digital camera 1 according to the embodiment, a release button (shutter button) 2, a power button 3, and a shooting/playback switch dial 4 are provided. On a front side of the digital camera 1, a lens barrel unit 6 having a photographing lens system 5, a stroboscopic light emitting section (flash) 7, and an optical viewfinder 8 are provided.

On a back side of the digital camera 1, a liquid crystal display (LCD) monitor 9, an eyepiece lens section 8a of the optical viewfinder 8, a wide angle side zoom (W) switch 10, a telephoto angle side zoom (T) switch 11, a menu (MENU) button 12, a confirmation (OK) button 13 and so on are provided. Additionally, inside a side of the digital camera 1, a memory card storing section 15 is provided. The memory card storing section 15 stores a memory card 14 (see FIG. 2) which saves shot image data.

(System Structure of the Digital Camera)

As illustrated in FIG. 2, the digital camera 1 has a CCD (Charge-Coupled Device) 20 as a solid-state image sensor, an analog front end section 21 (hereinafter, it is called an "AFE section."), a signal processing section 22, an SDRAM (Synchronous Dynamic Random Access Memory) 23, a ROM (Read Only Memory) 24, a motor driver 25 and so on. An image of a photographic subject which is entered via the photographing lens system 5 of the lens barrel 6 forms an image on a light-receiving surface of the CCD 20. The AFE section 21 converts an electric signal outputted from the CCD 20 (an analog RGB image signal) into a digital signal. The signal processing section 22 processes a digital signal outputted from the AFE section 21. The SDRAM 23 temporarily stores data. A control program and so on are kept in the ROM 24. The motor driver 25 drives the lens barrel unit 6.

The lens barrel unit 6 comprises the photographing lens system 5, an aperture unit 26, and a mechanical shutter unit 27. The photographing lens system 5 has a zoom lens, a focus lens and so on. Each driver unit of the photographing lens system 5, the aperture unit 26, and the mechanical shutter unit 27 is driven by the motor driver 25. The motor driver 25 is driven and controlled by a driving signal from a controlling section (CPU, Central Processing Unit) 28 of the signal processing section 22.

The CCD 20 comprises a plurality of pixels. An RGB primary-color filter (see FIG. 7: hereinafter, it is called an "RGB filter.") is placed on the plurality of pixels. The CCD 20 outputs an electric signal (an analog RGB image signal) corresponding to RGB, three primary colors.

The AFE section 21 comprises a TG (a timing signal generating section) 30, a CDS (a correlated double sampling section) 31, an AGC (an analog gain controlling section) 32, and an A/D converting section (an analog/digital converting section) 33. The TG 30 drives the CCD 20. The CDS 31 samples the electric signal (the analog RGB image signal) which is outputted from the CCD 20. The AGC 32 adjusts a gain of the image signal which is sampled in the CDS 31. The A/D converting section 33 converts the image signal which is gain-adjusted in the AGC 32 into a digital signal (hereinafter, it is called "RAW-RGB data").

The signal processing section 22 comprises a CCD interface (hereinafter, it is called a "CCD I/F") 34, a memory controller 35, a YUV converting section 36, a YUV compositing section 37, a resize processing section 38, a display output controlling section 39, a data compressing section 40, a media interface (hereinafter, it is called a "media I/F") 41, and the controlling section (CPU) 28. The CCD I/F 34 performs an output of a picture horizontal synchronizing signal (HD) and a picture vertical synchronizing signal (VD) to the TG 30 of the AFE section 21 and loads RAW-RGB data which is outputted from the A/D converting section 33 of the AFE section 21 synchronizing with these synchronizing signals. The memory controller 35 controls the SDRAM 23. The YUV converting section 36 converts the loaded RAW-RGB data into image data in YUV format which is displayable and recordable. The resize processing section 38 changes a size of an image corresponding to the size of the image data which is displayed or recorded. The display output controlling section 39 controls a display output of the image data. The data compressing section 40 records the image data in JPEG format and so on. The media I/F 41 writes the image data in the memory card 14 and reads out the image data written in the memory card 14. The controlling section (CPU) 28 performs a whole system control of the digital camera 1 and so on by the control program kept in the ROM 24 based on operating information inputted from an operating section 42.

The operating section 42 comprises the release button 2, the power button 3, the shooting/playback switch dial 4, the wide angle side zoom switch 10, the telephoto side zoom switch 11, the menu (MENU) button 12, the confirmation (OK) button 13 and the like on an external surface of the digital camera 1 (see FIGS. 1A to 1C). A predetermined operation indicating signal is inputted to the controlling section 28 by an operation of a user of the digital camera 1.

In the SDRAM 23, the RAW-RGB data loaded in the CCD I/F 34, YUV data which is converted in the YUV converting section 36 (image data in YUV format), YUV data which is composited in the YUV compositing section 37 (details will be explained later.), additionally, image data in JPEG format which is compressed in the data compressing section 40 and so on are stored.

Y in YUV is brightness data. U and V in the YUV provide color information. The U is a color difference between brightness data and blue data (B) and the V is a color difference between brightness data and red data (R). The YUV is a format in which colors are expressed by these three, the Y, U, and V.

(Monitoring Operation and Still Image Shooting Operation of the Digital Camera)

Next, a monitoring operation and a still image shooting operation of the digital camera 1 will be explained. In a still image shooting mode, the digital camera 1 performs the still image shooting operation while the monitoring operation as described below is performed.

Firstly, the power button 3 is turned on, the shooting/playback switch dial 4 is set to a shooting mode, and then operation of the digital camera 1 is started in a recording mode. When the controlling section 28 detects that the power button 3 is turned on and the shooting/playback switch dial 4 is set to the shooting mode, the controlling section 28 outputs a control signal to the motor driver 25 to move the lens barrel unit 6 to a position where a shooting is possible and to start operating the CCD 20, the AFE section 21, the signal processing section 22, the SDRAM 23, the ROM 24, the LCD monitor 9 and the like.

The photographing lens system 5 of the lens barrel unit 6 is aimed at a photographic subject, and thereby an image of the photographic subject is entered via the photographing lens system 5 and the image of the photographic subject is formed on a light receiving surface of each pixel of the CCD 20. And an electric signal corresponding to the image of the photographic subject outputted from the CCD 20 (an analog RGB image signal) is inputted to the A/D converting section 33 via the CDS 31 and the AGC 32, and then the electric signal is converted into 12-bit RAW-RGB data by the A/D converting section 33.

This RAW-RGB data is loaded to the CCD I/F 34 of the signal processing section 22 and is stored in the SDRAM 23 via the memory controller 35. And after the RAW-RGB data which is read out from the SDRAM 23 is converted into YUV data which is a displayable format (YUV signal) in the YUV converting section 36, the YUV data is stored in the SDRAM 23 via the memory controller 35.

The YUV data which is read out from the SDRAM 23 via the memory controller 35 is transmitted to the LCD monitor 9 via the display output controlling section 39 and a shooting image (moving image) is displayed. When monitoring the shooting image displaying on the LCD monitor 9, image data of the photographic subject for one frame is read out at 1/30 second (i.e. 30 fps) by the CCD I/F 34.

While this monitoring operation is performed, the shooting image is only displayed on the LCD monitor 9 functioning as an electric viewfinder, and the release button 2 is not yet pressed (and not half-pressed, either).

It is possible for the user to check the shooting image by displaying the shooting image on the LCD monitor 9. In addition, the display output controlling section 39 outputs a TV video signal, and the shooting image (moving image) is displayed on an external TV (television) via a video cable.

The CCD I/F 34 of the signal processing section 22 calculates an AF (Auto Focus) evaluation value, an AE (Auto Exposure) evaluation value, and AWB (Auto White Balance) evaluation value by the RAW-RGB data which is loaded.

The AF evaluation value is calculated by, for example, an output integral value of a high frequency component extraction filter and an integral value of brightness difference between adjacent pixels. In a focusing state, an edge part of the photographic subject is clear, and the high frequency component is highest. By use of this, in a case where the AF operation is performed (when a focus detection operation is performed), AF evaluation values in each position of focus lenses of the photographing lens system 5 are obtained, and a maximum value among them is taken as a focus detection position, and then the AF operation is performed.

The AE evaluation value and the AWB evaluation value are calculated on the basis of an RGB value of the RAW-RGB data. For example, an image plane corresponding to the light receiving surface of entire pixels of the CCD 20 is equally divided into 256 segments (16 horizontal segments and 16 vertical segments), and an RGB value of each segment is accumulated.

The controlling section 28 reads out the accumulated RGB value. In the AE operation, brightness of each segment of the image plane is calculated, and an appropriate exposure amount is determined by a distribution of brightness. An exposure condition (the number of releases of the electric shutter of the CCD 20, an aperture value of the aperture unit 26 and the like) is set based on the determined exposure amount. In the AWB operation, a control value of the AWB corresponding to a color of a light source of the photographic subject is determined based on a distribution of RGB. This AWB operation adjusts a white balance when the RAW-RGB data is converted into the YUV data in the YUV converting section 36. The AE operation and the AWB operation are continuously performed while the monitoring operation is performed.

While the monitoring operation described above is performed, if a still image shooting operation in which the release button 2 is pressed (from half-pressed to fully-pressed) is started, the AF operation which is a focusing position detecting operation and a still image recording operation are performed.

That is, when the release button 2 is pressed (from half-pressed to fully-pressed), the focus lenses of the photographing lens system 5 are moved by a drive command from the controlling section 28 to the motor driver 25, and for example, the AF operation of a contrast evaluation system, which is a so-called "hill-climbing AF", is performed.

In a case where the AF (focusing) coverage is an entire area from infinity to the closest, the focus lenses of the photographing lens system 5 are moved to each focus position in a distance from the closest to infinity or the distance from infinity to the closest, and the controlling section 28 reads out the AF evaluation value in each focus position which is calculated in the CCD I/F 34. And the focus lenses are moved to the focusing position where the AF evaluation value in each focus position is maximum.

Then the AE operation described above is performed. When completing an exposure, the mechanical shutter unit 27 is closed by a drive command from the controlling section 28 to the motor driver 25, and an analog RGB image signal for a still image is outputted from the CCD 20. And the analog image signal for the still image is converted into RAW-RGB data in the A/D converting section 33 of the AFE section 21 as well as when monitoring described above.

This RAW-RGB data is loaded into the CCD I/F 34 of the signal processing section 22, and is converted into YUV data in the YUV converting section 36, which is described later, and then is stored in the SDRAM 23 via the memory controller 35. This YUV data is read out from the SDRAM 23, and is converted into a suitable size corresponding to the number of recording pixels in the resize processing section 38, and then is compressed into image data in JPEG format and so on in the data compressing section 40. After this compressed image data in JPEG format and so on is restored in the SDRAM 23, this compressed image data is read out from the SDRAM 23 via the memory controller 35, and then is stored in the memory card 14 via the media I/F 41.

(Dynamic Range Expanding Process by the YUV Converting Section 36)

The YUV converting section 36 of the digital camera 1 according to the present embodiment has a dynamic range expansion processing function to expand a dynamic range.

On each pixel comprising the CCD 20 of the digital camera 1, an RGB filter (see FIG. 7) of Bayer arrangement is placed. In a general RGB filter, with respect to light which has a wide wavelength range such as sunlight, a sensitivity to brightness of each color, R (red), G (green), and B (blue) is different.

Figure 3:
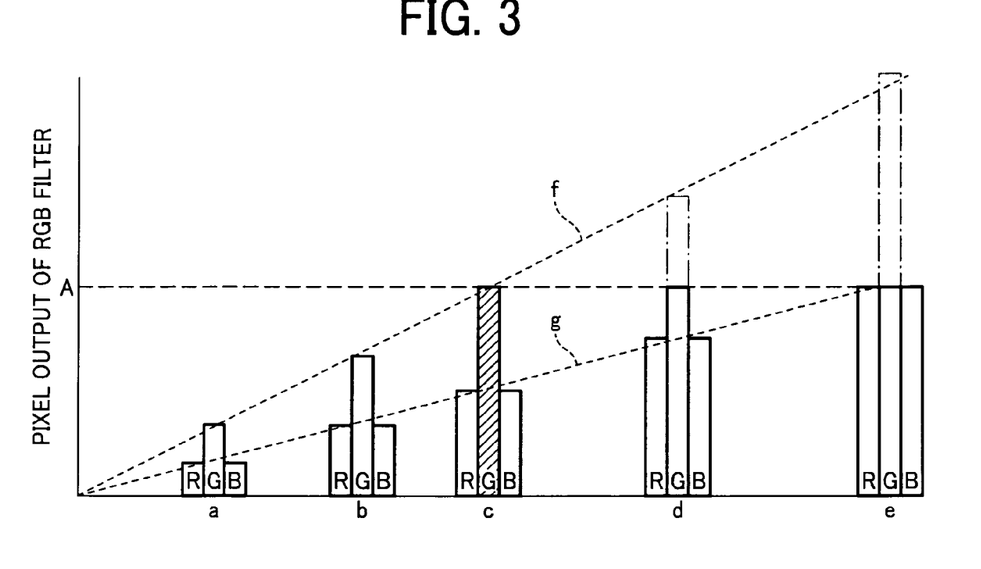
FIG. 3 is an explanatory view illustrating a principle of expanding a dynamic range according to the embodiment 1 of the present invention.

For example, as illustrated in FIG. 3, in a case where the CCD 20 has an RGB filter ("a", "b", and "c" in FIG. 3) with a sensitivity in which a sensitivity of a G (green) filter is approximately twice as high as sensitivities of R (red) and B (blue) filters, when the same amount of light, which has a wide wavelength range such as sunlight, enters the RGB filter, a pixel output of the G filter (a shaded part of "c" in FIG. 3) reaches a saturation level A (a dashed line A) earlier, compared to each pixel output of the R and B filters. In FIG. 3, a dotted-line "f" illustrates a pixel sensitivity characteristic of the G filter and a dotted-line "g" illustrates each pixel sensitivity characteristic of the R and B filters. The pixel sensitivity characteristic of the G filter has approximately a twofold sensitivity compared to each pixel sensitivity characteristic of the R and B filters.

Incidentally, in a digital camera including a solid-state image sensor such as a CCD and the like having a general RGB filter, as the RGB filters of the "a", "b", and "c" in FIG. 3, a range of the dynamic range is set corresponding to the saturation level A of the pixel output of the G filter which has a high sensitivity. That is, in a case where the pixel output of the G filter reaches the saturation level A, the pixel output of the R and B filters is approximately a half (½) of the saturation level A.

On the other hand, in the present invention, as the RGB filters of "d" and "e" in FIG. 3, if the pixel output of the G filter is beyond the saturation level A, when each pixel output of the R and B filters is within the range of the saturation level A, from each pixel output level of the R and B filters, on the basis of each pixel sensitivity characteristic of the R and B filters (the dotted-line "g" in FIG. 3) and the pixel sensitivity characteristic of the G filter (the dotted-line "f" in FIG. 3), the pixel output of the G filter is compensated (dash-dot line parts in FIG. 3) so as to expand the dynamic range corresponding to only an amount which is compensated described above.

Hereinafter, a dynamic range expanding process according to the present embodiment will be explained.

Figure 4:
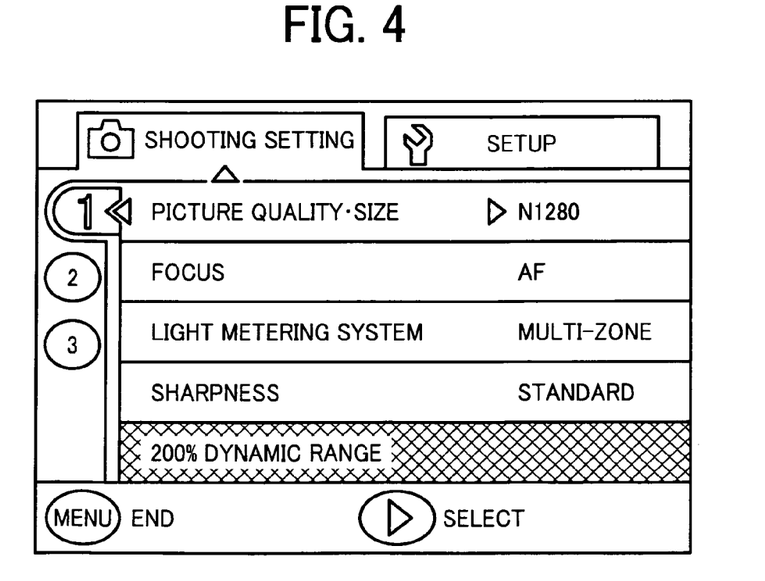
FIG. 4 illustrates an example of a shooting setting screen displayed on an LCD (Liquid Crystal Display) monitor.

In the present embodiment, when the menu (MENU) button 12 (see FIG. 1C) is pressed by the user, and then, for example, a shooting setting screen as illustrated in FIG. 4 appears on the LCD monitor 9. By selecting an item of "200% dynamic range" on the screen, a control signal is outputted from the controlling section 28 to the YUV converting section 36 and the dynamic range expanding process to double the dynamic range is performed.

For example, in a case where a background of a photographic subject has an extremely bright part and so on, when the user presses the menu (MENU) button 12 and selects the item of "200% dynamic range" by the judgment of the user, the dynamic range expanding process is performed.

The present embodiment is based on the premise that the pixel sensitivity characteristic of the G filter has approximately a twofold sensitivity compared to each pixel sensitivity characteristic of the R and B filters as described above. Accordingly, in a state where a light source is extremely red or extremely blue when shooting, the pixel sensitivity of the R and B filters is often saturated more than the pixel sensitivity of the G filter. If the dynamic range expanding process is performed in this state, accurate tones and an exact color reproduction are not obtained. Therefore, in this state, the user should not select the item of "200% dynamic range" by the judgment of the user.

Figure 5:
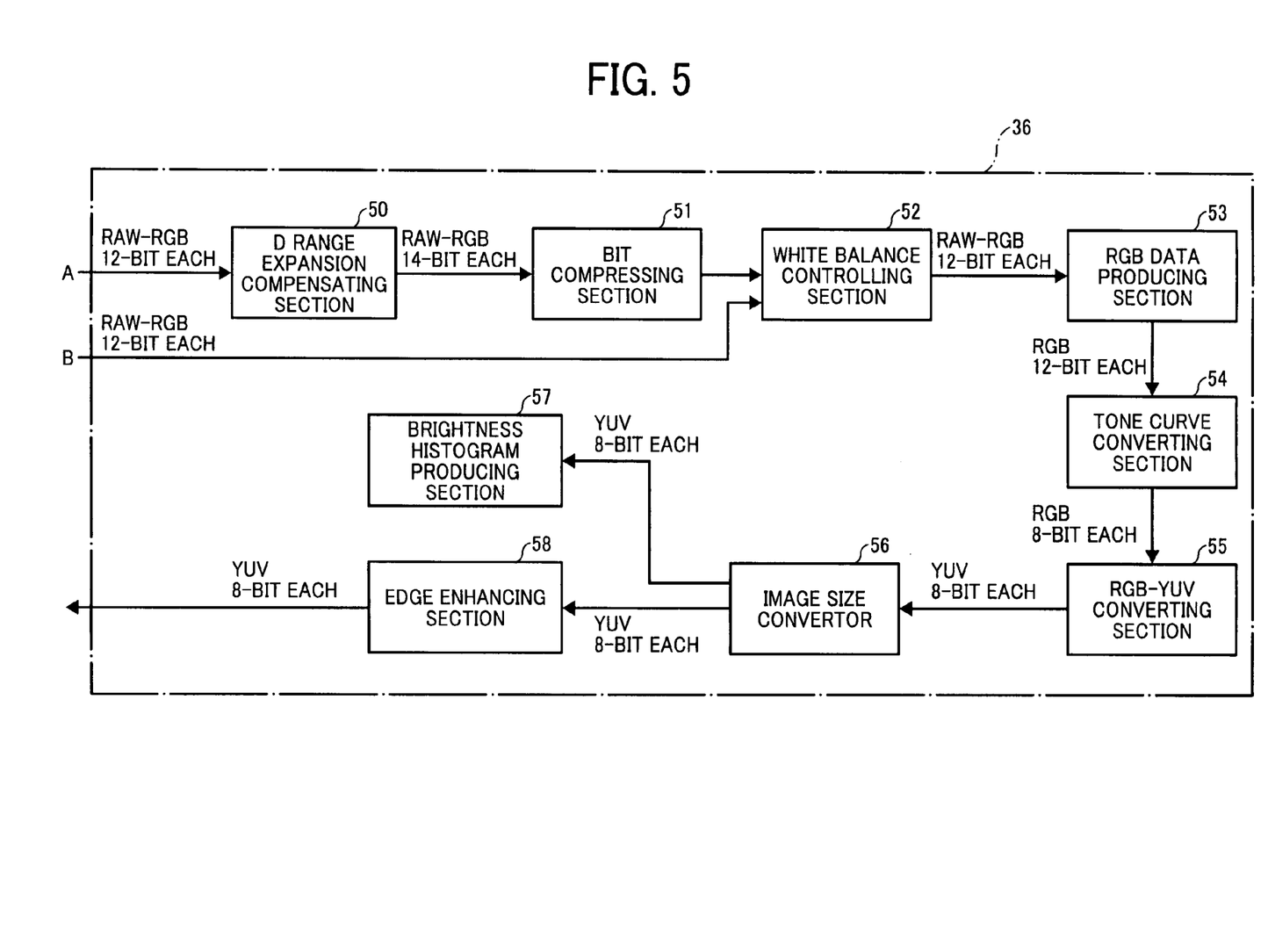
FIG. 5 is a block diagram illustrating a structure of a YUV converting section according to the embodiment 1 of the present invention.

The dynamic range expanding process is performed in the YUV converting section 36. As illustrated in FIG. 5, the YUV converting section 36 comprises a dynamic range expansion compensating section (hereinafter, it is called a "D range expansion compensating section") 50, a bit compressing section 51, a white balance controlling section 52, an RGB data producing section 53, a tone curve converting section 54, an RGB-YUV converting section 55, an image size convertor 56, a brightness histogram producing section 57, and an edge enhancing section 58.

In the dynamic range expanding process according to the present embodiment, two processes are performed. A first process is that RAW-RGB data (A in FIG. 5) is inputted to the D range expansion compensating section 50. A second process is that RAW-RGB data (B in FIG. 5) is inputted to the white balance controlling section 52 without being inputted to the D range expansion compensating section 50. The RAW-RGB data (A in FIG. 5) inputted to the D range expansion compensating section 50 and the RAW-RGB data (B in FIG. 5) inputted to the white balance controlling section 52 without being inputted to the D range expansion compensating section 50 are the same RAW-RGB data which are read out from the SDRAM 23. Firstly, the first process will be explained in detail.

(The First Process)

Figure 6:
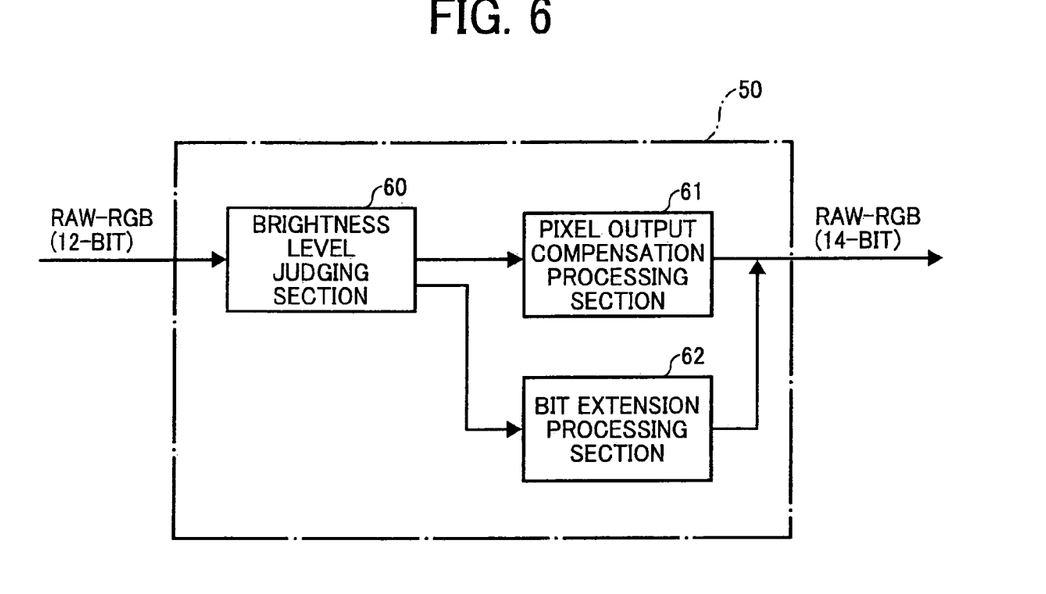
FIG. 6 is a block diagram illustrating a structure of a D (dynamic) range expansion estimating and compensating section according to the embodiment 1 of the present invention.

As illustrated in FIG. 6, the D range expansion compensating section 50 comprises a brightness level judging section 60, a pixel output compensation processing section 61, and a bit extension processing section 62. The brightness level judging section 60 detects a pixel output of each pixel provided with the RGB filter from the RAW-RGB data (A in FIG. 5) which is read out from the SDRAM 23 and judges if a pixel output of a pixel provided with the G filter which has highest sensitivity (hereinafter, it is called "pixel output of G filter") reaches a saturation level or not. The pixel output compensation processing section 61 performs a compensating process of the pixel output of the G filter, which reaches the saturation level, by a pixel output of a pixel provided with the R and B filters (hereinafter, it is called "pixel output of R and B filters"), which is in the vicinity of the G filter, in a case where the brightness level judging section 60 judges that the pixel output of the G filter reaches the saturation level. The bit extension processing section 62 performs only a bit extension from 12-bit to 14-bit without converting of an output level on the pixel output of the G filter and the pixel output of the R and B filters, in a case where the brightness level judging section 60 judges that the pixel output of the G filter does not reach the saturation level.

Figure 7:
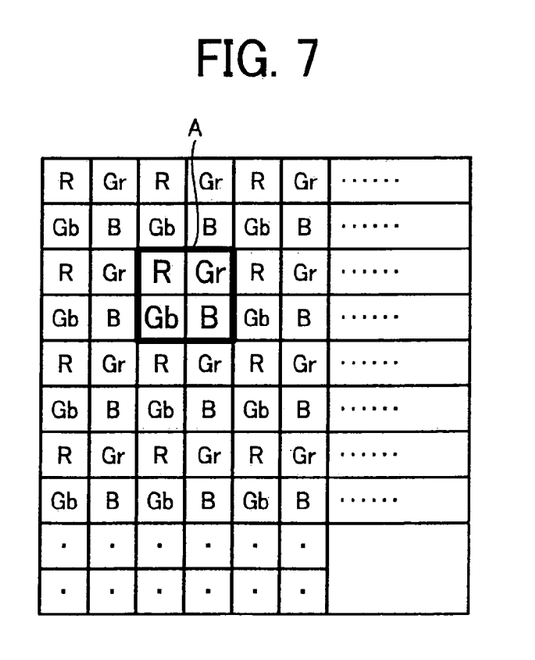
FIG. 7 illustrates a pixel arrangement position and a processing unit of a CCD having an RGB filter according to the embodiment 1 of the present invention.

In a case where the brightness level judging section 60 judges if the pixel output of the G filter reaches the saturation level or not, in the present embodiment, with respect to each pixel of the CCD 20 having the RGB filter, as illustrated in FIG. 7, 2×2 pixels in a bold-line frame A (Gr and Gb, two pixels of the G filter, and each one pixel of the R and B filters) is taken as a processing unit (a minimum unit). In a case where at least one pixel output of the two pixels of the G filter in the processing unit (the bold-line frame A) reaches the saturation level, the G filter has the twofold sensitivity compared to the R and B filters as described above, and accordingly pixel output values of the G filter (Gr' and Gb') are calculated by the following formulas (1). In the following formulas (1), coefficients "kr", "kb", and "kbg" are coefficients which are set on the basis of a white balance gain.

$$Gr'=krR+kbB+kgbGb$$

$$Gb'=krR+kbB+kgrGr \quad\quad \text{formulas (1)}$$

The pixel output compensation processing section 61, as shown in the formulas (1) described above, firstly multiplies each pixel output of R, B and Gb filters by coefficients (kr, kb, and kgb), and each of the calculated numbers is added, and thereby Gr', the pixel output of the Gr filter is calculated. Likewise, by use of the formulas (1), Gb', the pixel output of the Gb filter is calculated. And then, pixel values of Gr and Gb in the processing unit (2×2 pixels) are replaced. The pixel output values of the G filter (Gr' and Gb') are data beyond 12-bit, therefore here the pixel output values of the G filter (Gr' and Gb') are once replaced by 14-bit data. Each maximum value of the pixel output of the R and B filters is 4095 (12-bit) and the maximum value of the pixel output value of the G filter becomes 8190, therefore it is treated as 14-bit data.

Incidentally, in a case where the brightness level judging section 60 judges if the pixel output reaches the saturation level or not, it is necessary that a defective pixel not be used. That is, in a case where there is a defective pixel in the pixel provided with the G filter and a value which is always saturated is outputted, the pixel provided with the G filter in the same processing unit is replaced by a larger value, and thereby a new defective pixel is generated. Additionally, in a case where there is a defective pixel in the pixel provided with the R and B filters, a conversion of the pixel provided with the G filter by the formulas (1) may become an inaccurate value.

Therefore, in a case where the brightness level judging section 60 judges that there is a defective pixel in the processing unit (2×2 pixels), a pixel having the same color filter as the defective pixel in the vicinity of the processing unit is used instead of the defective pixel. And thereby, in a case where the brightness level judging section 60 judges if the pixel output reaches the saturation level or not, there is no opportunity that the defective pixel is used, and the compensating process with high precision is performed on a pixel output in which the G filter is placed, when reaching a predetermined saturation level.

Figure 8A:
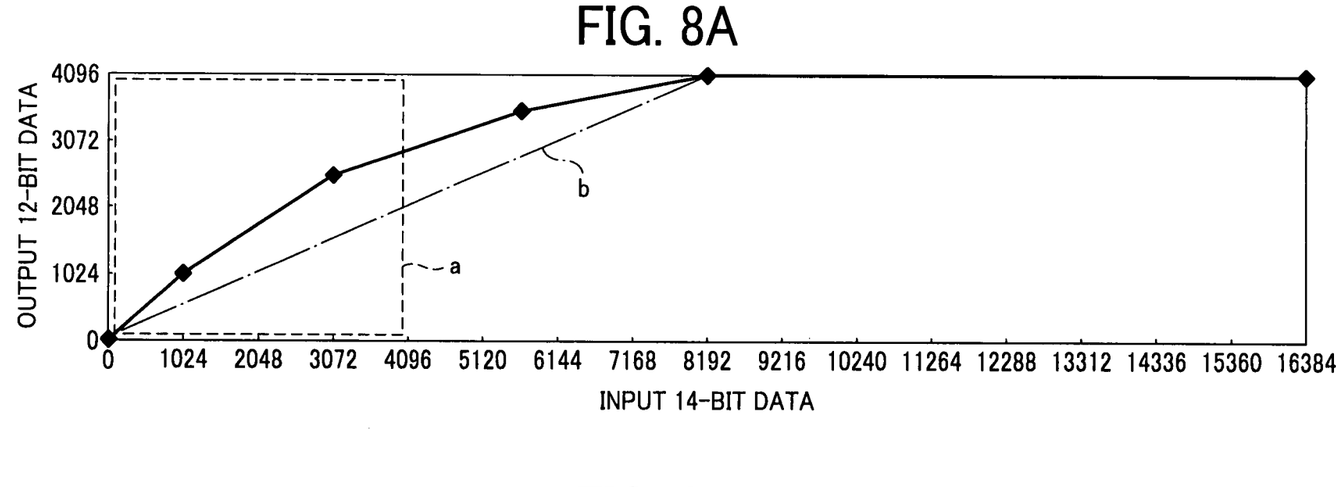
FIG. 8A illustrates a conversion characteristic which compresses extended 14-bit data of a pixel output of a G filter to 12-bit data according to the embodiment 1 of the present invention.

And the pixel output data of the R and B filters and the pixel output data of the G filter which reach the saturation level and perform the compensating process are outputted to the bit compressing section 51 from the D range expansion compensating section 50. The bit compressing section 51, for example, by a conversion characteristic as illustrated in FIG. 8A (in FIG. 8A, a four-sectional broken line approximation characteristic in which three sectional points are specified and intervals between these three sectional points are approximated by a straight line), reduces the pixel output of the G filter of the pixel output of the R, G and B filters which are extended to 14-bit data to 12-bit data. In FIG. 8A, a dash-line square "a" illustrates a range of 12-bit data, and a dash-dot line "b" illustrates a simple linear conversion characteristic in which data of the maximum value, 8190, is multiplied by ½.

In the conversion characteristic illustrated in FIG. 8A, the maximum value of the pixel output of the G filter is 8190, therefore 8190 is compressed so as to become 4095. Values of the pixel output of the R and B filters are compressed corresponding to a compression rate of the pixel output of the G filter.

As described above in the present embodiment, as an example in a case where the pixel output of the G filter extended to the maximum value, 8190 is compressed to the maximum value, 4095, the conversion characteristic (a solid line in FIG. 8A) having the three sectional points as illustrated in FIG. 8A is used. In the present embodiment, the following two effects where a simple non-sectional point linear conversion characteristic ("b" in FIG. 8A) is not obtained are obtained.

As a first effect, a larger number of bits are allocated to reliable data. That is, in a case where the compensating process is performed on the pixel output of the G filter which reaches the saturation level, the compensating process is performed on a range which is equal to or more than a prescribed value in the vicinity of the saturation level of the pixel output of the G filter, and is not performed on a range which is equal to or less than this prescribed value. Therefore, an accuracy of the data is different from ranges on which the compensating process is performed and is not performed.

That is, in a case where the pixel output of the G filter which is saturated by the formulas (1) is compensated, a brightness level of the photographic subject is not often reproduced accurately in a range where the compensating process is performed depending on a color of a main photographic subject. On the other hand, in a range where the compensating process is not performed, data is actual data (an analog RGB image signal) that is outputted from the CCD 20 having the RGB filter and A/D converted. Therefore, this data is highly reliable.

That is, in the conversion characteristic (a solid-line in FIG. 8A) illustrated in FIG. 8A according to the present embodiment, for example, when a value of input 14-bit data is 1024, a value of output 12-bit data is 1024, and this illustrates that former data is used. On the other hand, for example, when a value of input 14-bit data is 3072, a value of output 12-bit data is 2560, and in this range a bit allocation is smaller than a bit allocation before the compensating process, and thereby some bit errors will occur.

Thus, the conversion characteristic (a solid-line in FIG. 8A) having three sectional points according to the present embodiment is adopted, instead of the simple non-sectional point linear conversion characteristic (a dash-dot line in FIG. 8A), so that the bit allocation can be gradually smaller, and further a larger number of bits can be allocated to the data, which is highly reliable.

As a second effect, tones in low and middle brightness are accurately saved. That is, in a case where a bit compression is performed by the simple non-sectional point linear conversion characteristic ("b" in FIG. 8A), in a range where the compensating process of a low brightness side is not performed, the bit allocation may become ¼. Therefore, an image may not appear to have tones. On the other hand, in a case where the bit compression is performed by the conversion characteristic (a solid-line) according to the present embodiment as illustrated in FIG. 8A, a compression rate which is to become approximately the same value before and after the bit compressions in the bit compressing section 51 is used for data corresponding to the pixel output in a low brightness level which is equal to or less than the saturation level, so that a tone property in the low brightness level can be maintained favorably.

In the present embodiment, when the extended 14-bit data of the pixel output of the G filter is reduced to 12-bit data, as illustrated in FIG. 8A, the bit compression is performed by the four-sectional broken line approximation characteristic (conversion characteristic) in which the three sectional points are specified and the intervals between these three sectional points are approximated by the straight line, however the number of these sections are not limited especially to. For example, a conversion characteristic may be a two-sectional broken line approximation (conversion characteristic) in which one sectional point is specified, however the bit allocation is changed significantly in the vicinity of the sectional point, and thereby the two effects described above becomes smaller. Therefore, a preferable conversion characteristic is a broken line approximation characteristic (conversion characteristic) having the number of sections which is equal to or more than three sections.

Figure 8B:
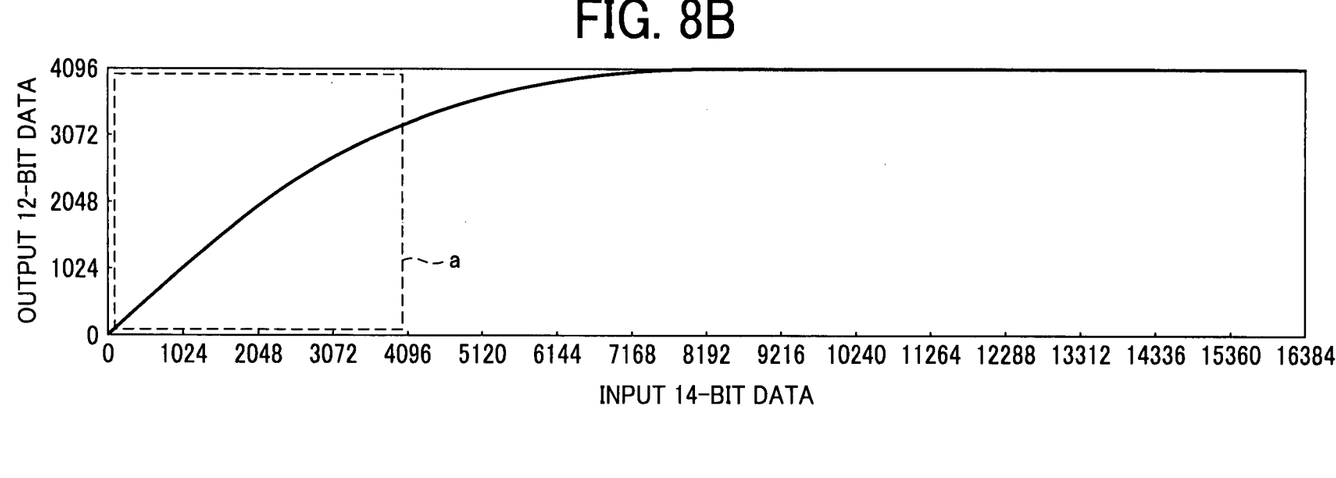
FIG. 8B illustrates a conversion characteristic which compresses extended 14-bit data of a pixel output of a G filter to 12-bit data according to another example of the embodiment 1 of the present invention.

In addition, the conversion characteristic in which the extended 14-bit data of the pixel output of the G filter is compressed to 12-bit data, as illustrated in FIG. 8B, may be a conversion characteristic by which a curved line does not have a plurality of sectional points. That is, the conversion characteristic by this curved line is a conversion characteristic having the number of sections which is 8192 for the conversion characteristic having the four sections in FIG. 8A. In FIG. 8B, a dash-line square "a" illustrates a range of 12-bit data.

Additionally, a look-up table having numerical value data after compressing to 12-bit data in regard to values from 0 to 8192 of input 14-bit data is provided, so that the extended 14-bit data of the pixel output of the G filter can be compressed favorably to 12-bit data by the conversion characteristic by this curved line.

Pixel output data of the R, G and B filters compressed from 14-bit to 12-bit in the bit compressing section 51 are inputted to the white balance controlling section 52. The white balance controlling section 52 amplifies respectively RAW-RGB data (the pixel output data of the R, G and B filters) which is inputted. In this case, the controlling section 28 calculates a compensation value to adjust a white balance on the basis of the AWB evaluation value which is calculated in the CCD I/F 34, and the compensation value which is calculated is outputted to the white balance controlling section 52. The white balance controlling section 52 adjusts the white balance on the basis of the compensation value which is inputted.

The pixel output data of the R, G and B filters (12-bit) in which the white balance is adjusted is inputted to the RGB data producing section 53 from the white balance controlling section 52. The RGB data producing section 53 performs a compensating and calculating process on RAW data which has only one color data for one pixel of the Bayer arrangement and the like, and produces all data of RGB for one pixel.

Figure 9:
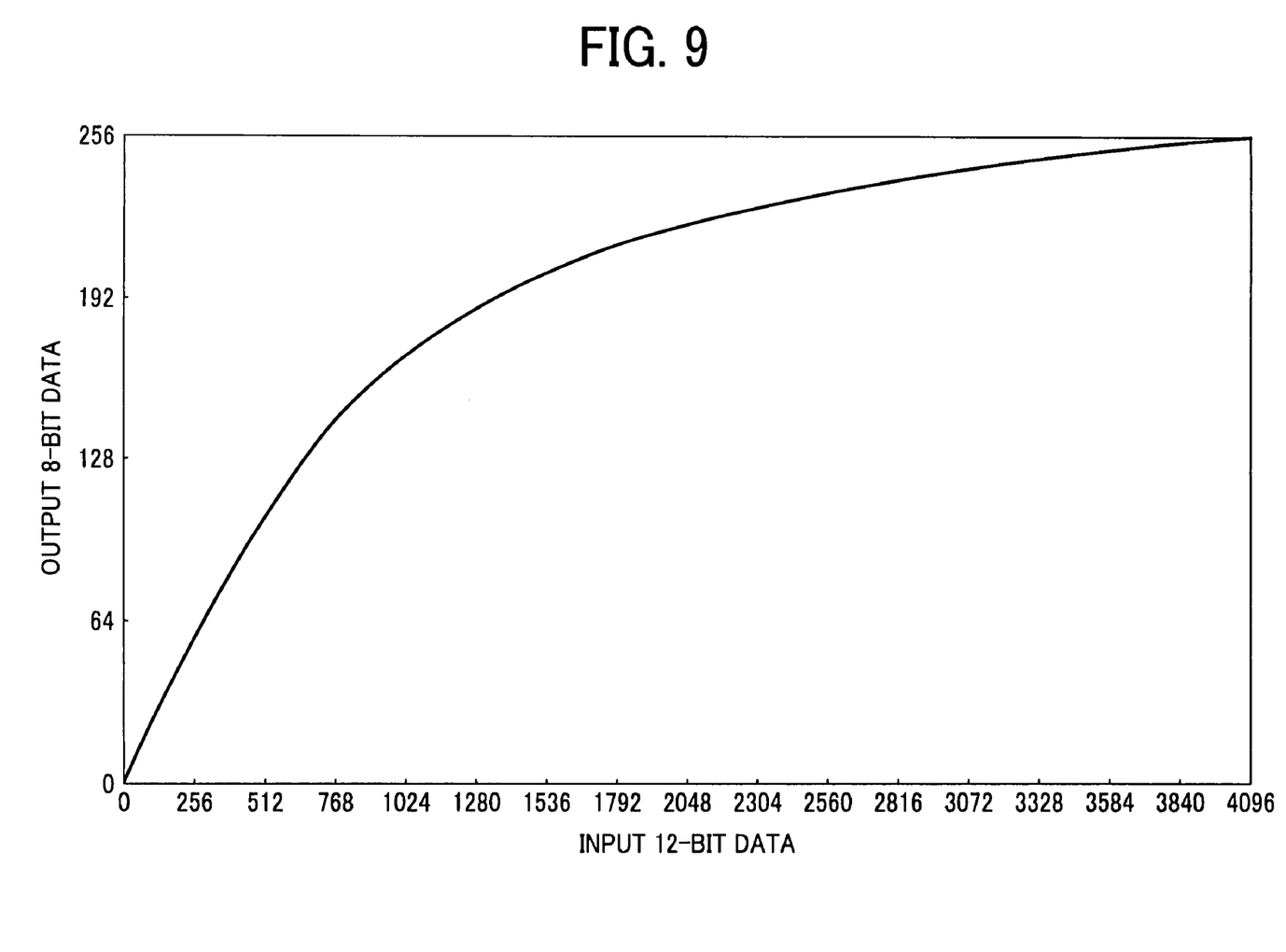
FIG. 9 illustrates a conversion table in which 12-bit RGB data converts (γ-converts) into 8-bit RGB data.

All the data (12-bit) of RGB which is produced in the RGB data producing section 53 is inputted to the tone curve converting section 54. The tone curve converting section 54 performs a γ conversion which converts 12-bit RGB data to 8-bit RGB data by a conversion table as illustrated in FIG. 9, and produces 8-bit RGB data, and then outputs the 8-bit RGB data to the RGB-YUV converting section 55.

The RGB-YUV converting section 55 converts the RGB data (8-bit) which is inputted to YUV data by a matrix calculation, and outputs the YUV data to the image size convertor 56. The image size convertor 56 performs a reduction or an expansion to a desired image size on the YUV data (8-bit) which is inputted, and outputs the YUV data on which the reduction or the expansion to the desired image size is performed to the brightness histogram producing section 57 and the edge enhancing section 58.

The brightness histogram producing section 57 produces a brightness histogram by the YUV data which is inputted. The edge enhancing section 58 performs an edge enhancing process and the like corresponding to an image on the YUV data which is inputted. YUV data in which the compensating process of the pixel output of the G filter described above is performed (hereinafter, it is called "first YUV data") is saved in the SDRAM 23 via the memory controller 35.

(The Second Process)

Next, the second process will be explained. In the second process, RAW-RGB data which is read out from the SDRAM 23 (B in FIG. 5) is inputted to the white balance controlling section 52 without being inputted to the D range expansion compensating section 50. Hereinafter, the second process performs the same processes as the first process.

That is, the white balance controlling section 52 amplifies RAW-RGB data (pixel output data of the R, G and B filters) which is inputted. In this case, the controlling section 28 calculates a compensation value to adjust a white balance on the basis of the AWB evaluation value which is calculated in the CCD I/F 34, and the compensation value which is calculated is outputted to the white balance controlling section 52. The white balance controlling section 52 adjusts the white balance on the basis of the compensation value which is inputted.

The pixel output data of the R, G and B filters (12-bit) in which the white balance is adjusted is inputted to the RGB data producing section 53 from the white balance controlling section 52. The RGB data producing section 53 performs a compensating and calculating operation on RAW data which has only one color data for one pixel of the Bayer arrangement and the like, and produces all data of RGB for one pixel.

All the data (12-bit) of RGB which is produced in the RGB producing section 53 is inputted to the tone curve converting section 54. The tone curve converting section 54 performs a γ conversion which converts 12-bit RGB data to 8-bit RGB data by a conversion table as illustrated in FIG. 9, and produces 8-bit RGB data, and then outputs the 8-bit RGB data to the RGB-YUV converting section 55.

The RGB-YUV converting section 55 converts the RGB data (8-bit) which is inputted to YUV data by a matrix calculation, and outputs the YUV data to the image size convertor 56. The image size convertor 56 performs a reduction or an expansion to a desired image size on the YUV data (8-bit) which is inputted, and outputs the YUV data on which the reduction or the expansion to the desired image size is performed to the brightness histogram producing section 57 and the edge enhancing section 58.

The brightness histogram producing section 57 produces a brightness histogram by the YUV data which is inputted. The edge enhancing section 58 performs an edge enhancing process and the like corresponding to an image on the YUV data which is inputted. The YUV data in which the compensating process of the pixel output of the G filter described above is not performed (hereinafter, it is called "second YUV data") is saved in the SDRAM 23 via the memory controller 35.

The YUV compositing section 37 takes only Y data (brightness data) from the first YUV data which is read out from the SDRAM 23 and takes only UV data (color difference data) from the second YUV data which is read out from the SDRAM 23, and then composites one YUV data (hereinafter, it is called "third YUV data"). The third YUV data which is composited is saved in the SDRAM 23 via the memory controller 35.

This third YUV data is read out from the SDRAM 23, and is converted into a size corresponding to the number of recording pixels in the resize processing section 38, and then is compressed into image data in JPEG format and the like in the data compressing section 40. After this compressed image data in JPEG format and the like is restored in the SDRAM 23, this compressed image data is read out from the SDRAM 23 via the memory controller 35, and then is stored in the memory card 14 via the media I/F 41.

Thus, in the present embodiment, in a shooting where the pixel output of the G filter in which sensitivity in the processing unit is high reaches the saturation level, the pixel output of the G filter which is saturated is compensated on the basis of the pixel output of the R and B filters in which sensitivity is low. And thereby, as illustrated in FIG. 3, on the basis of an extended area where the pixel output of the G filter ("d" and "e" in FIG. 3) is compensated (dash-dot line parts of the pixel output of G filter of "d" and "e" in FIG. 3), the dynamic range can be expanded by 200% at one shooting.

Therefore, in a case where there is a high-brightness part in a background and the like of a shooting image, it is possible to prevent an overexposure from occurring and obtain a favorable tone property.

In addition, in the present embodiment, the RAW-RGB data is read out from the SDRAM 23, and the first YUV data produced from the pixel output which is compensated in the pixel output compensation processing section 61 by the first process and the second YUV data produced from the pixel output which reaches a predetermined saturation level without performing an compensating process in the pixel output compensation processing section 61 by the second process are loaded into the YUV compositing section 37. And then the Y data (brightness data) taken out from the first YUV data and the UV data (color difference data) taken out from the second YUV data are composited in the YUV compositing section 37 and the third YUV data is produced.

Accordingly, a dynamic range expansion is performed only on the Y data (brightness data) of the first YUV data produced from the pixel output which is compensated in the pixel output compensation processing section 61 and former UV data (color difference data) is used for colors, so that a hue displacement can be prevented and an exact color reproduction can be performed.

In a case where a compensating process of the pixel output of the G filter which reaches the saturation level by the D range expansion compensating section 50 is performed by use of the formulas (1) and the dynamic range expanding process is performed, when a light source is extremely red or extremely blue, the compensation value of the G filter is not often calculated accurately and the pixel output of the R and B filters is saturated. As a result, an exact color reproduction is not often achieved.

However, even in a state like the above, by performing the process according to the embodiment described above, the dynamic range expanding process is performed only on the Y data (brightness data) of the first YUV data, and original UV data (color difference data) is used for colors, so that the hue displacement can be prevented and the accurate color can be reproduced.

Figure 10A:
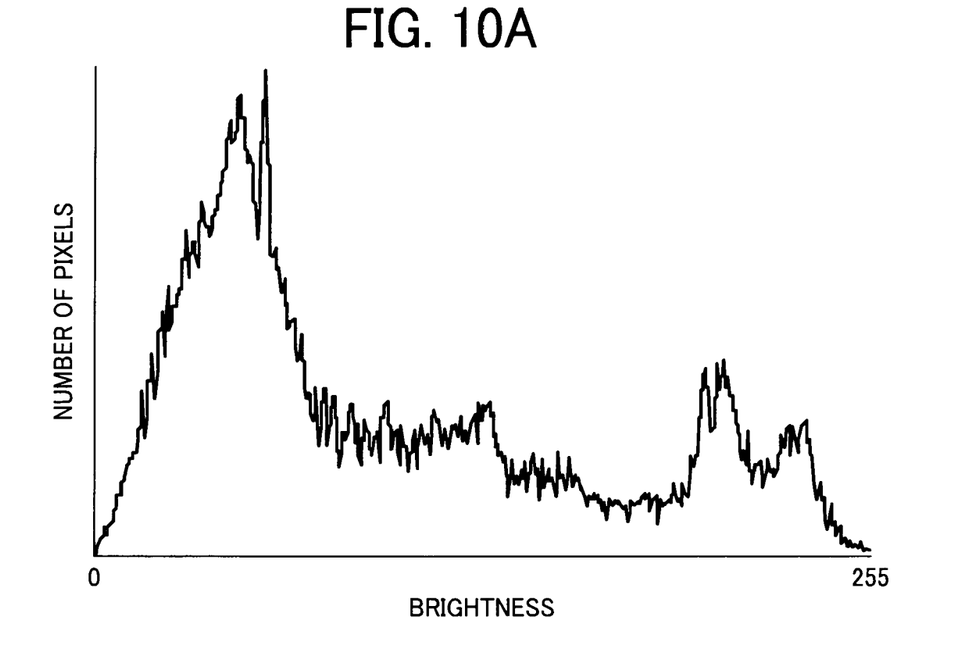
FIG. 10A illustrates a histogram in a case where a dynamic range expanding process is performed according to the embodiment 1 of the present invention.

FIG. 10A illustrates an example of a histogram which is produced in the brightness histogram producing section 57, in a case where the dynamic range expanding process according to the present embodiment is performed when the pixel output of the G filter is beyond the saturation level. It is clear from this histogram that bars at a maximum brightness part (255) in this histogram hardly have heights, the overexposure hardly occurs, and favorable tones are reproduced, by performing the dynamic range expanding process.

Figure 10B:
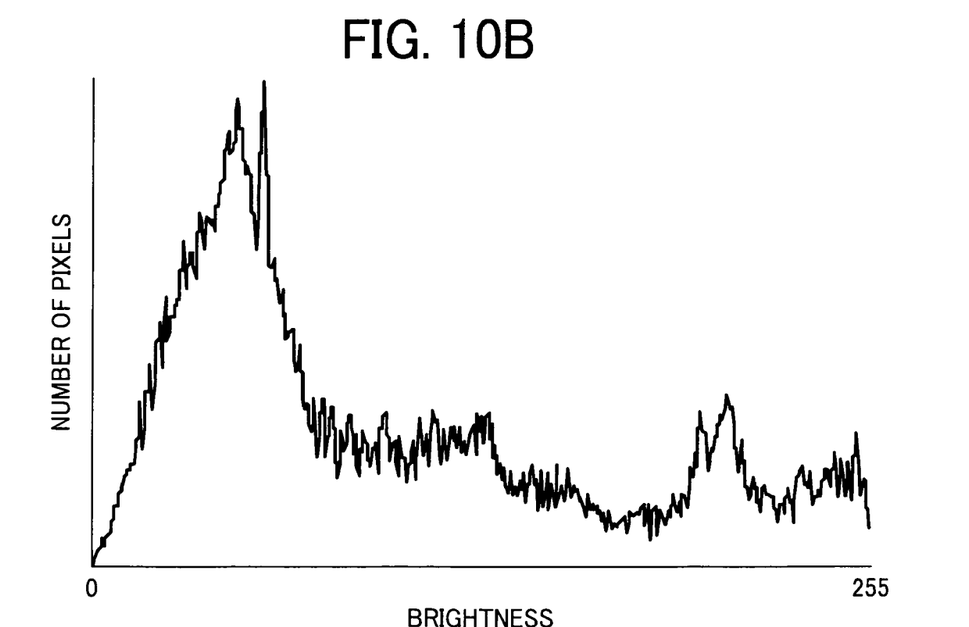
FIG. 10B illustrates a histogram in a case where the dynamic range expanding process is not performed according to the embodiment 1 of the present invention.

On the other hand, FIG. 10B illustrates an example of a histogram which is produced in the brightness histogram producing section 57, in a case where the dynamic range expanding process according to the present embodiment is not performed, when the pixel output of the G filter is beyond the saturation level. It is clear from this histogram that bars at the maximum brightness part (255) in this histogram have heights, and the overexposure occurs, by not performing the dynamic range expanding process.

In the explanation of the embodiment 1 described above and in FIG. 3, it is explained that the saturation level A in FIG. 3 which is a predetermined saturation level judgment value corresponds to a maximum value, which is 4095, of 12-bit data after compensating, however this is not limited. For example, in the vicinity of a high brightness part where the output is completely saturated, in a CCD having an RGB filter in which a linearity of the output is not good, a value of 4032, which is smaller than a value of 4095, in which the output is completely saturated is taken as a predetermined saturation level value (the saturation level A in FIG. 3), and a pixel output over the value above may be a subject of the compensating process.

In addition, depending on structures of digital cameras, the saturation value is less than a maximum value of the 12-bit data, which is 4095, even in a high-brightness photographic subject. Likewise, in this case, the predetermined saturation level may be a smaller value than a value of 4095.

Thus, when a predetermined saturation level is less than a value of 4095, a conversion curve of FIG. 9 is changed correspondingly to a conversion characteristic, so that a value of the output of the bit compressing section 51 can be 4095, and it is possible to expand the dynamic range without changing the following processes.

Additionally, in the present embodiment, as illustrated in FIG. 5, the bit compression converting section 5 is structured to compress the 14-bit RAW-RGB data (pixel output data of the R, G, and B filters) which is outputted from the D range expansion compensating section 50 into 12-bit data, and the white balance controlling section 52 and the RGB data producing section 53 are structured to perform data processes of the 12-bit data. However, besides the structure described above, the bit compressing section 51 is provided behind the RGB data producing section 53, and the bit compression converting section 51 is structured to compress the 14-bit data which is outputted from the RGB data producing section 53 into the 12 bit-data.

Embodiment 2

Figure 11:
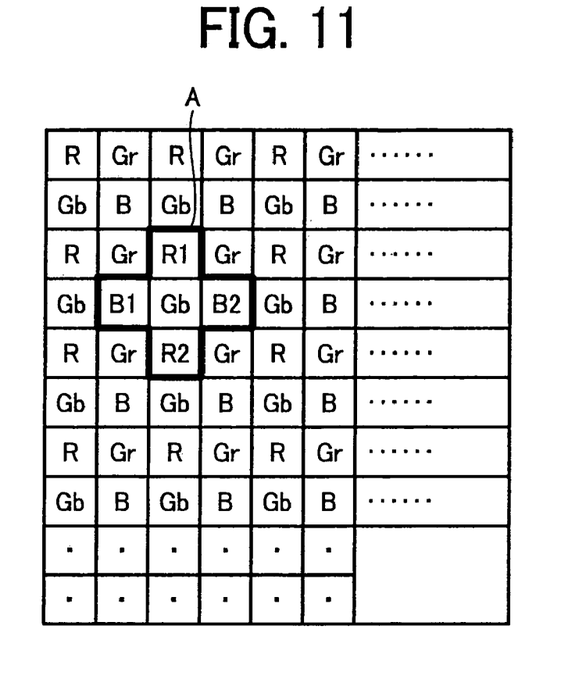
FIG. 11 illustrates a pixel arrangement position and a processing unit of a CCD having an RGB filter according to an embodiment 2 of the present invention.

In the embodiment 1, as illustrated in FIG. 7, in regard to the CCD 20 having the RGB primary-color filter, 2×2 pixels is taken as the processing unit (minimum unit). However, in the present embodiment, as illustrated in FIG. 11, a processing unit (minimum unit) includes five pixels in a bold-line frame A (one pixel of the G filter (Gb) in the center, two pixels of the R filter (R1 and R2) in a vertical direction and two pixels of the B filter (B1 and B2) in a horizontal direction), and the processing unit of the present embodiment has a wider range than the processing unit of the embodiment 1. In the embodiment 2, a structure of a digital camera, a monitoring operation, a still image shooting operation, and a dynamic range expanding process are the same as the embodiment 1.

In a case where the pixel output of the G filter (Gb) which is in the processing unit of the bold-line frame A as illustrated in FIG. 11 reaches the saturation level, a sensitivity of the G filter is twice as high as the R and B filters as described, and a pixel output value of the G filter (G') is calculated by the formula (2) below. In the formula (2), coefficients "kr" and "kb" are coefficients which are respectively set on the basis of a white balance gain.

$$G'=\{kr(R1+R2)/2\}+\{kb(B1+B2)/2\} \quad \text{formula (2)}$$

The pixel output compensation processing unit 61 of the D range expansion compensating section 50 illustrated in FIG. 6 replaces the pixel output value of the G filter which is calculated by the formula (2) as the pixel output value of the G filter which is in the processing unit described above (see FIG. 11). Hereinafter, the same process as the embodiment 1 is performed.

Thus, the processing unit is widened and an influence by a sensitivity difference which other pixels of the R1 and R2 filters and other pixels of the B1 and B2 filters in the processing unit have is moderated. Therefore, it is possible to more accurately perform the dynamic range expansion compensating process on the pixel output of the G filter.

Embodiment 3

Figure 12:
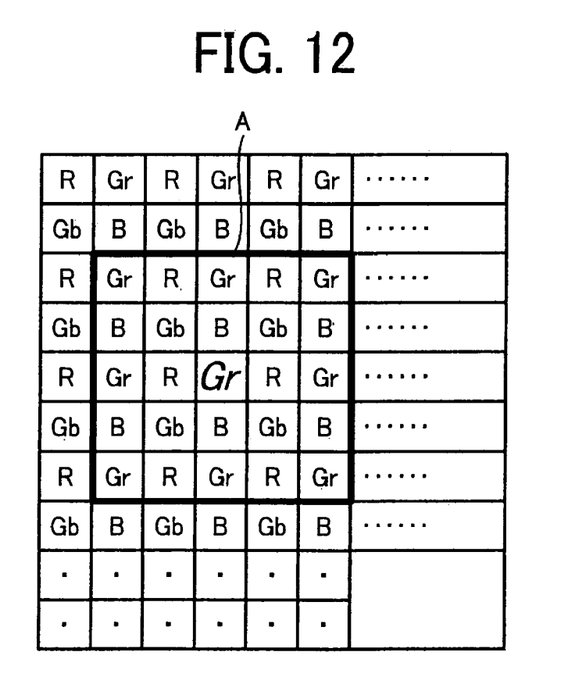
FIG. 12 illustrates a pixel arrangement position and a processing unit of a CCD having an RGB filter according to an embodiment 3 of the present invention.

In the present embodiment, as illustrated in FIG. 12, a processing unit includes 5×5 pixels which are five pixels in a horizontal direction and five pixels in a vertical direction in a bold-line frame A (13 pixels of the G filter (Gr and Gb), six pixels of the R filter and six pixels of the B filter) in regard to the CCD 20 having the RGB primary-color filter. In the embodiment 3, a structure of a digital camera, a monitoring operation, a still image shooting operation, and a dynamic range expanding process are the same as the embodiment 1.

In a case where the processing unit is wider than those of the embodiments 1 and 2, the dynamic range expansion compensating process is performed on the basis of brightness information of a wide range, and this is the same as applying a low-pass filter. Accordingly, an edge part of brightness variation may become dull. Therefore, in the present embodiment, a size of a wider processing unit is partially changed, for example, by use of the AF evaluation value.

That is, in the CCD I/F 34 of the signal processing section 34 illustrated in FIG. 22, the AF evaluation value to perform the AF is calculated as described above. The AF evaluation value is equivalent to a so-called output of a high-pass filter (HPF), and a larger value is outputted in a part where there is brightness variation in an image plane of a shooting image. The controlling section 28 reads out an AF evaluation value when shooting a still image and judges a part where there is brightness variation in the image plane and a part where there is no brightness variation in the image plane. And the controlling section 28 controls the D range expansion compensating section 50 to set to narrow the processing unit in the part where there is brightness variation and to set to widen the processing unit in the part where there is no brightness variation as illustrated in FIG. 12, on the basis of this judging data.

Thus, even in a case where the processing unit is widened further, a setting to narrow the processing unit in the part where there is brightness variation is performed, and thereby, it is possible to accurately perform the dynamic range expansion compensating process without reducing a resolution.

In each embodiment described above, an RGB, three-primary-color system filter is placed as a color separation filter.

However, likewise, each embodiment of the present invention is applied in a structure in which a complementary color system filter is placed as the color separation filter.

According to embodiments of the present invention, in a case where it is judged that a pixel output on which a specific color filter is placed reaches a predetermined saturation level, on the basis of an output from a pixel on which a different color filter is placed which is not saturated in the vicinity, the dynamic range is expanded to compensate a pixel output in an area which is equal to or more than the saturation level. And thereby, it is possible to expand the dynamic range at one shooting, without compositing a plurality of shooting images with different exposure amounts.

Furthermore, according to embodiments of the present invention, first YUV data which is produced from a pixel output which is compensated and second YUV data which is produced from a pixel output which reaches a predetermined saturation level without compensating are loaded, and then brightness data (Y data) which is taken out from the first YUV data and color difference data (UV data) which is taken out from the second YUV data are composited to produce third YUV data. Accordingly, a dynamic range expansion is performed only on the brightness data of the first YUV data produced in the pixel output which is compensated, and former color difference data is used for colors, so that a hue displacement can be prevented and an exact color reproduction can be performed.

According to embodiments of the present invention, it is possible for a user to perform a compensating operation when the pixel output on which a specific color filter is placed reaches a predetermined saturation level by a judgment of the user by selecting an operation in an operation selecting section.

According to embodiments of the present invention, a data compression rate corresponding to a pixel output in an area where the pixel output is equal to or less than the saturation level is smaller than a data compression rate corresponding to a pixel output in an area where the pixel output reaches a saturation level and data is compressed by a smaller rate. Therefore, a tone property in the area which is equal to or less than the saturation level can be maintained.

According to embodiments of the present invention, a compression rate so as to become an approximately same value before and after the bit compression is performed is used for data corresponding to a pixel output in a low brightness level in an area which is equal to or less than the saturation level. Therefore, the tone property in the low brightness level can be maintained.

According to embodiments of the present invention, in a case where there is a defective pixel in a processing unit, a pixel in the vicinity of the defective pixel and where the color separation filter of the same color as the defective pixel is placed is used instead of the defective pixel. And thereby, the defective pixel is not used, when a judging process is performed if a pixel output on which a specific color filter is placed reaches a saturation level or not. Accordingly, a compensation with high precision can be performed on the pixel output on which the specific color filter is placed when it reaches a predetermined saturation level.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging apparatus comprising:
    an image sensor which receives a photographic subject image which enters via an optical system on a light receiving surface having a plurality of pixels where a color separation filter of a plurality of colors is placed on a front side of each pixel, and converts into an electric signal;
    a pixel output judging section which judges each of the pixels output of the plurality of the pixels if any of the pixels output is equal to or more than a predetermined saturation level or not;
    a compensation processing section, in a case where a pixel output of a pixel where a color separation filter of a specific color is placed is judged to be equal to or more than the predetermined saturation level by the pixel output judging section, which compensates the pixel output which is judged to be equal to or more than the predetermined saturation level based on a pixel output of a pixel where a color separation filter other than the specific color is placed in the vicinity of the pixel output of the pixel where the color separation filter of the specific color is placed; and
    a YUV compositing section, based on first YUV data produced from a pixel output which is compensated by the compensation processing section and second YUV data produced from a pixel output which is equal to or more than the predetermined saturation level without being compensated by the compensation processing section, which produces third YUV data by compositing brightness data obtained from the first YUV data and color difference data obtained from the second YUV data.

2. The imaging apparatus according to claim 1, wherein a processing unit, in a case of judging each pixel output of the plurality of the pixels in the pixel output judging section, is a size of 2×2 pixels in horizontal and vertical directions.

3. The imaging apparatus according to claim 1, further comprising:
    a selecting section which selects and performs the compensation process, in a case where a pixel output of the plurality of the pixels on which the color separation filter of the specific color is placed is equal to or more than the predetermined saturation level.

4. The imaging apparatus according to claim 1, further comprising:
    a bit compressing section which recompresses to a first bit number, data of a pixel output, which is once extended to a second bit number from the first bit number which is equal to or less than the predetermined saturation level outputted from the compensation processing section in a case where the pixel output of the plurality of pixels where the color separation filter of the specific color is placed is equal to or more than the predetermined saturation level,
    and in the bit compressing section, a compression rate, which is smaller than a compression rate for data corresponding to a pixel output in an area where the pixel output is equal to or more than the predetermined saturation level, is used for data corresponding to a pixel output in an area where the pixel output is equal to or less than the predetermined saturation level.

5. The imaging apparatus according to claim 4, wherein a compression rate to become approximately a same value before and after a bit compression in the bit compressing section is used for data corresponding to a pixel output in a low brightness level where the pixel output is equal to or less than the predetermined saturation level.

6. The imaging apparatus according to claim 1, wherein in a case where there is a defective pixel in a processing unit, a pixel, which is in the vicinity of the defective pixel and where the color separation filter of the same color as the defective pixel is placed, is used instead of using the defective pixel.

7. An imaging method of an imaging apparatus having an image sensor which receives a photographic subject image which enters via an optical system on a light receiving surface having a plurality of pixels where a color separation filter of a plurality of colors is placed on a front side of each pixel, and converts into an electric signal, the imaging method comprising:
   a pixel output judging step of judging each of the pixels output of the plurality of the pixels if any of the pixels output is equal to or more than a predetermined saturation level or not;
   a compensation processing step of, in a case where a pixel output of a pixel where a color separation filter of a specific color is placed is judged to be equal to or more than the predetermined saturation level by the pixel output judging step, compensating the pixel output which is judged to be equal to or more than the predetermined saturation level based on a pixel output of a pixel where a color separation filter of other than the specific color is placed in the vicinity of the pixel output of the pixel where the color separation filter of the specific color is placed; and
   a YUV compositing step of, based on first YUV data produced from a pixel output which is compensated by the compensation processing step and second YUV data produced from a pixel output which is equal to or more than the predetermined saturation level without being compensated by the compensation processing step, producing third YUV data by compositing brightness data obtained from the first YUV data and color difference data obtained from the second YUV data.

8. The imaging method according to claim 7, wherein a processing unit, in a case of judging each pixel output of the plurality of the pixels in the pixel output judging step, is a size of 2×2 pixels in horizontal and vertical directions.

9. The imaging method according to claim 7, further comprising:
   a selecting step of selecting and performing the compensation process, in a case where a pixel output of the plurality of the pixels on which the color separation filter of the specific color is placed is equal to or more than the predetermined saturation level.

10. The imaging method according to claim 7, further comprising:
   a bit compressing step of recompressing to a first bit number, data of a pixel output, which is once extended to a second bit number from the first bit number which is equal to or less than the predetermined saturation level outputted from the compensation processing step in a case where the pixel output of the plurality of pixels where the color separation filter of the specific color is placed is equal to or more than the predetermined saturation level, and in the bit compressing step, a compression rate, which is smaller than a compression rate for data corresponding to a pixel output in an area where the pixel output is equal to or more than the predetermined saturation level, is used for data corresponding to a pixel output in an area where the pixel output is equal to or less than the predetermined saturation level.

11. The imaging method according to claim 10, wherein a compression rate to become approximately a same value before and after a bit compression in the bit compressing step is used for data corresponding to a pixel output in a low brightness level where the pixel output is equal to or less than the predetermined saturation level.

12. The imaging method according to claim 7, wherein in a case where there is a defective pixel in a processing unit, a pixel, which is in the vicinity of the defective pixel and where the color separation filter of the same color as the defective pixel is placed, is used instead of using the defective pixel.

* * * * *